United States Patent
Wight et al.

(10) Patent No.: US 8,714,341 B2
(45) Date of Patent: May 6, 2014

(54) ROTARY POSITIONING FENCE

(71) Applicant: U.S. Natural Resources, Inc., Woodland, WA (US)

(72) Inventors: Geoffrey D. H. Wight, Coldstream (CA); Thomas W. Congdon, Salmon Arm (CA); Tim Staal, Salmon Arm (CA)

(73) Assignee: U.S. Natural Resources, Inc., Woodland, WA (US)

( * ) Notice: Subject to any disclaimer, the term of this patent is extended or adjusted under 35 U.S.C. 154(b) by 0 days.

(21) Appl. No.: 13/920,895

(22) Filed: Jun. 18, 2013

(65) Prior Publication Data

US 2013/0277173 A1    Oct. 24, 2013

Related U.S. Application Data

(63) Continuation of application No. 12/792,666, filed on Jun. 2, 2010, now Pat. No. 8,490,777.

(60) Provisional application No. 61/183,880, filed on Jun. 3, 2009.

(51) Int. Cl.
*B65G 47/12* (2006.01)
*B65G 47/68* (2006.01)
*B65G 47/22* (2006.01)

(52) U.S. Cl.
CPC .............. *B65G 47/682* (2013.01); *B65G 47/22* (2013.01)
USPC .......................................... 198/452; 198/456

(58) Field of Classification Search
USPC .............. 198/452, 456, 436, 442, 890, 890.1, 198/367, 367.1, 348
See application file for complete search history.

(56) References Cited

U.S. PATENT DOCUMENTS

| | | | |
|---|---|---|---|
| 2,253,453 A | 8/1941 | Van Deinse |
| 2,778,474 A | 1/1957 | DeKoning |
| 3,033,341 A | 5/1962 | Cromeens |
| 4,231,460 A | 11/1980 | Heikinheimo |
| 4,944,635 A | 7/1990 | Carlier et al. |
| 5,381,712 A | 1/1995 | Head, Jr. et al. |
| 5,865,080 A | 2/1999 | Jackson |
| 5,911,302 A | 6/1999 | Jackson |
| 6,173,829 B1 | 1/2001 | Jackson et al. |
| 6,311,828 B1 | 11/2001 | Newnes et al. |
| 6,382,067 B1 | 5/2002 | Gagnon |

(Continued)

FOREIGN PATENT DOCUMENTS

| | | |
|---|---|---|
| CA | 2191389 C | 5/1997 |
| CA | 2311406 A1 | 12/2001 |

OTHER PUBLICATIONS

Canadian Intellectual Property Office Examiner's Report, issued May 22, 2013.

*Primary Examiner* — Gene Crawford
*Assistant Examiner* — William R Harp
(74) *Attorney, Agent, or Firm* — Schwabe, Williamson & Wyatt

(57) ABSTRACT

Embodiments provide systems, methods and apparatuses for positioning boards and other wood pieces in preparation for sawing/trimming. In embodiments, a continuous track loop conveys board stops slideably mounted to board stop guides positioned perpendicular to the direction of flow. A horizontal frame member provides a series of positioning guides through which a cam follower coupled to a board stop is diverted, thus adjusting the position of board stops in a direction perpendicular to the direction of flow without the use of braking devices or other added sources of mass, friction or vibration.

29 Claims, 12 Drawing Sheets

(56) References Cited

U.S. PATENT DOCUMENTS

| | | |
|---|---|---|
| 6,651,798 B2 | 11/2003 | Newnes et al. |
| 6,705,190 B2 | 3/2004 | Newnes et al. |
| 7,377,376 B2 | 5/2008 | Hannebauer |
| 7,419,047 B2 | 9/2008 | Cesselli et al. |
| 8,069,972 B2 | 12/2011 | Raybon et al. |
| 8,109,302 B2 | 2/2012 | Borne et al. |

ROTARY POSITIONING FENCE

CROSS-REFERENCE TO RELATED APPLICATIONS

This application is a continuation of U.S. patent application Ser. No. 12/792,666, filed Jun. 2, 2010, which claims the benefit of U.S. Provisional Application No. 61/183,880, filed Jun. 3, 2009, the entire disclosures of which are incorporated herein.

TECHNICAL FIELD

Embodiments herein relate to the field of sawmill machinery, and, more specifically, to systems, methods and apparatuses for positioning lumber for presentation to a sawing station.

BACKGROUND

Sawmills and lumber mills typically route lumber through a series of cutting and finishing stations. After exiting one station, the lumber must be positioned for presentation to the next station. This positioning may take place during transportation of the lumber from one station to the next. In certain stations, boards are trimmed at one or both ends. Current systems often position boards lengthwise along a conveyor with evenly spaced lugs used to separate and convey the boards towards the trimming station.

Conventional positioning systems often use conveyor chains to carry boards positioned lengthwise across the width of the conveyor, while simultaneously using pipe rolls or similar mechanisms to urge the boards transverse to the direction of flow towards a fence that results in a workpiece position where the defect line matches a downstream saw position. Other workpiece positioning systems do not use the transverse rolls, but rely instead on a positioning bumper to push wood into position (see for example U.S. Pat. No. 591,130).

In moving paddle fence systems, boards are pushed against positioning bumpers or "paddles" connected to chains that are configured in a continuous moving loop. The paddles move in the direction of material flow, parallel with the board conveyor chains and at the same velocity. The rotating chain and paddle concept allows more time for each board to reach its final destination than a traditional trailing fence design.

Speed and accuracy are critical in positioning lumber for presentation to sawing stations—inaccurate positioning leads to waste, while slower speeds limit output. However, in the current positioning systems, increasing the processing speed tends to cause a reduction in accuracy. Similarly, as the current systems are adapted to increase accuracy, speed is diminished. As planer optimization becomes more widely accepted, the need for positioning accuracy has increased. But lumber system speeds have increased to such an extent that the traditional trailing fences are not as effective as they once were, often resulting in the positioning systems causing a bottle neck in the processing system.

Existing paddle fence systems use mechanisms such as paddle brakes, air actuators, and/or hydraulic positioners to position paddles. These mechanisms increase the accuracy of positioning. However, they also increase the complexity of the systems, add mass to the paddles, induce vibration and increase friction. Therefore, existing systems are limited in their range of possible operation speeds relative to lug spacing and physical size. To match the wider lug spacing configuration frequently used in sawmill board transfers while also matching the board transfer speeds, the currently available paddle fence systems must be physically extended to compensate for the vibration and other problems created by the positioning mechanisms.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION OF DISCLOSED EMBODIMENTS

Figure 1:
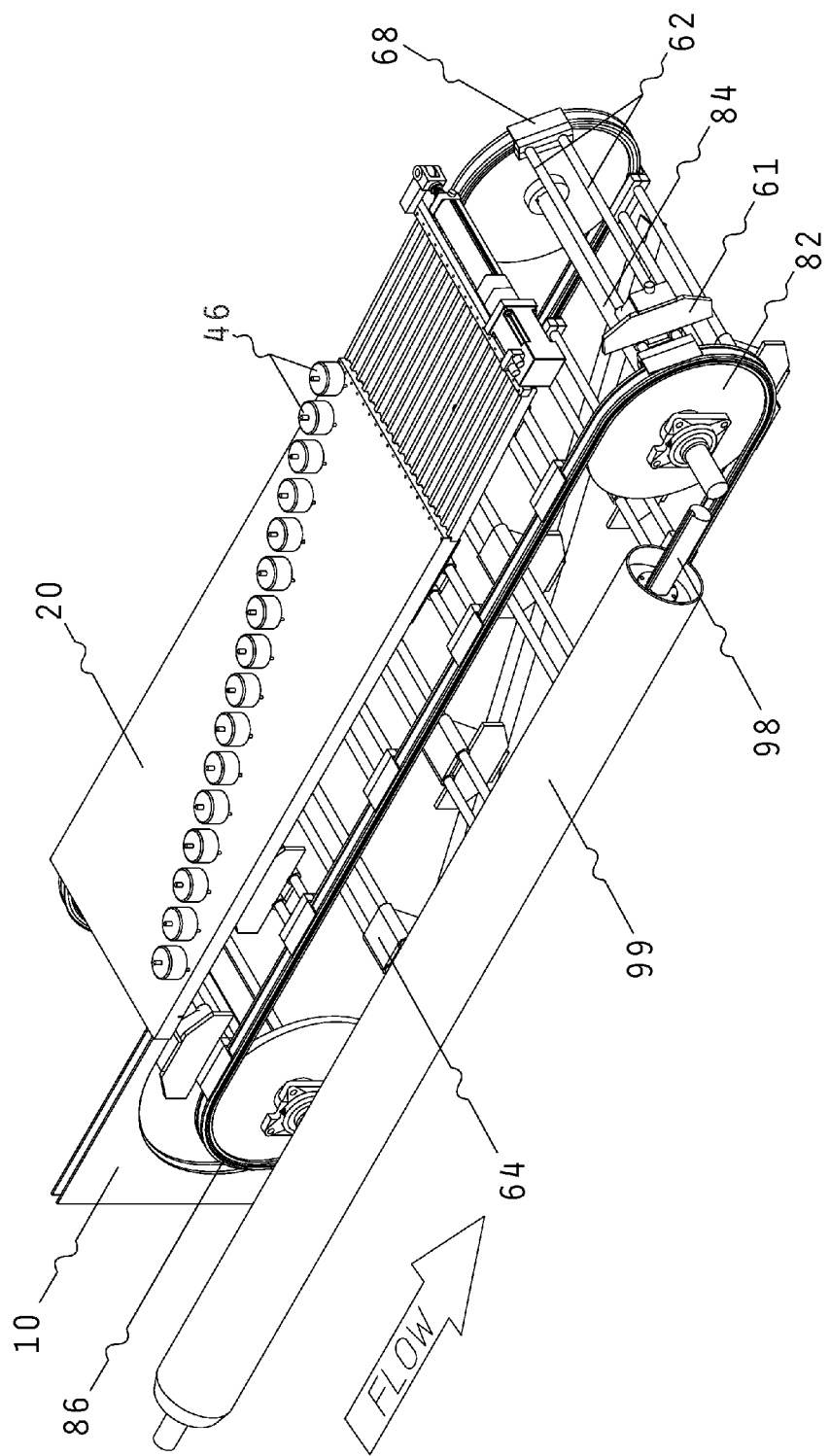
FIG. 1 illustrates an isometric view of a moving fence apparatus in accordance with various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

The terms "lumber" and "boards" are used interchangeably herein to mean work pieces laterally positioned on a transport/conveyor such that their lengths are perpendicular to the direction of flow (i.e. extending across the width of the conveyor rather than along the length of the conveyor).

The terms "board stop" and "paddle" are used interchangeably and are herein defined as a moving fence component configured to be conveyed synchronously with lumber in the direction of lumber flow for lateral positioning of boards (i.e. positioning along an axis perpendicular to direction of lumber flow).

The term "cam follower" is herein defined as any component configured to be translocated within a positioning guide. Cam followers in accordance with various embodiments may include a pin, a ball bearing, or other components and may be cylindrical, round, or of any other shape, solid/hollow, and/or made of any suitable material (e.g. a metal, polymer, or any resilient material known in the art). Cam followers may be constructed as a single part/unit, or they may be constructed from/include two, three, four or more parts.

The term "continuous track loop" is herein defined to include, but is not limited to, one, two, three or more continuous belts, chains, or other moving elements rotatable around rotating elements such as sprockets, gears, wheels, rollers, etc. In some embodiments, a continuous track loop includes a pair of chains/chain loops mounted on rollers/sprockets/wheels and driven simultaneously. In other embodiments, belts or other similar components alone or in combination may be included. A continuous track loop may be configured to convey one or more components, including board stops and board stop guides, and may be adjustable to convey the components at a rate matching that of lumber flow.

The term "actuator" is herein defined as a device for converting a signal/energy into motion/force, and is intended to include any such device powered for example, electrically, pneumatically, and/or hydraulically, in any combination. In embodiments, an actuator may be used to produce rotary or linear motion to position a guide selector, board, longitudinal/adjustable guide, or other component.

Embodiments may include applications in which a board is moved toward and/or held against a paddle or board stop. Other embodiments may include applications in which a board is pushed laterally by a paddle or board stop. Embodiments may include one or more rolls, skatewheels and/or other similar mechanisms known in the art for pushing a board laterally toward a paddle or board stop.

Embodiments herein provide a moving fence for positioning of workpieces prior to presentation to a processing station, such as an end saw station. In various embodiments, boards conveyed along a conveyor in a direction of flow may be axially/laterally positioned on the conveyor by a moving fence apparatus positioned and with paddle stops moving generally parallel to the board conveyor. Embodiments of a moving fence may convey paddles/board stops synchronously with lumber and may be adjustable to accommodate a range of lug spacing and/or lumber spacing configurations.

In addition, embodiments may provide components of a moving fence (such as a board stop guide or positioning guide) that is configured to be integrated with a pull back style moving fence (with or without a roller) and/or a push style moving fence. Positioning may include pulling/pushing the boards against the paddles or pushing/pulling paddles against the boards. Some embodiments may include one or more rollers positioned in parallel with the direction of board flow, and such rollers may push/pull boards to paddles. Similarly, devices other than rollers may be utilized to move the boards towards the paddles. In other embodiments, paddles/board stops may position boards by pushing the boards, rather than by stopping the boards as they are pushed toward the paddles/board stops.

Embodiments further provide a board positioning system configured for improved accuracy and speed, using a series of positioning guides to position boards. The use of such positioning guides reduces/eliminates the need for mechanisms such as brakes, air actuators, and hydraulic positioners to position the board stops, thereby avoiding the increase in board stop mass, friction, resistance and vibration that are induced by those mechanisms. As exemplified by the embodiments described, positioning guides may allow for a potentially unlimited range of lug spacing options and may consequently enable operation of such board positioning systems on shorter conveyances, which may be fitted to existing processing operations. For example, common transfers may be used for both positioner and trimmer, avoiding inaccuracies and other issues created through hand-offs between transfers. Thus, embodiments of a moveable fence as described herein may be integrated by sawmill operations to directly feed downstream processes and/or transfer equipment already in place downstream.

In various embodiments, methods, apparatuses, and systems for positioning workpieces are provided. In exemplary embodiments, a computing device may be endowed with one or more components of the disclosed apparatuses and/or systems and may be employed to perform one or more methods as disclosed herein. In embodiments, a computing device may be coupled to an actuator, a track loop, and/or other components. In some embodiments, a computing device may control positioning of a component, actuate an actuator to position a component, start/stop operation of the track loop, etc.

Figure 2:
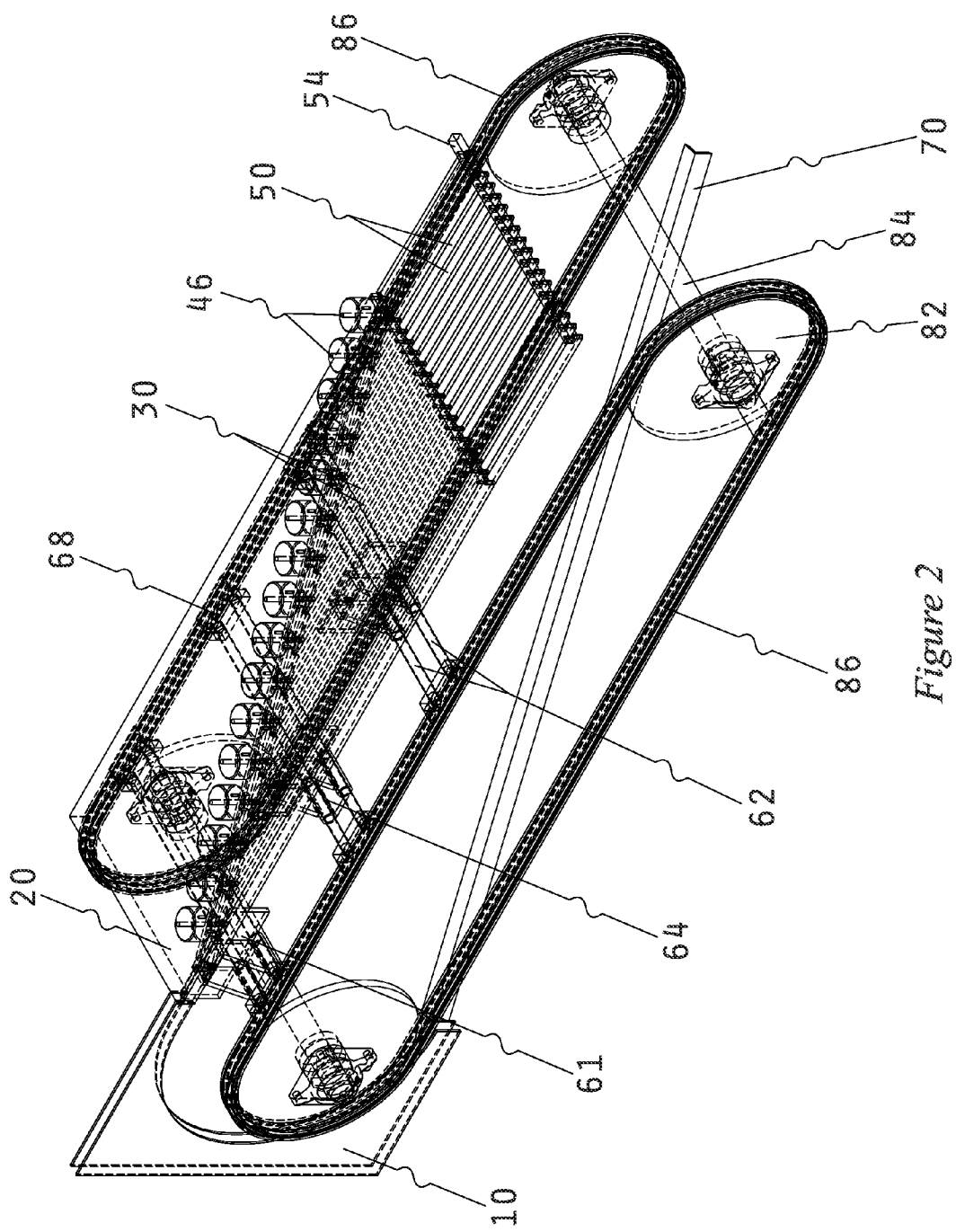
FIG. 2 illustrates a perspective view of a moving fence apparatus in accordance with various embodiments.

FIGS. 1 and 2 show exemplary moving fence apparatuses in accordance with various embodiments. FIG. 1 illustrates an isometric view of a moving fence apparatus in accordance with embodiments. As illustrated, a roll 99 may be rotatable around a roll shaft 98 in a direction generally perpendicular to the flow of boards (arrow shows direction of flow), which is operable to move a board toward a paddle and/or to retain a board against a paddle.

FIG. 2 shows a perspective view of a moving fence apparatus in accordance with various embodiments.

As illustrated, an embodiment of a moving fence apparatus may include a continuous track loop comprising two chains 86 mounted in parallel on rotatable members 82. Rotatable members 82 may be rotatable around shafts 84. Board stop guides 62 may be coupled to chains 86 by guide fasteners 68. A board stop 61 may be coupled to a board stop guide 62 by a slide mount 64. Board stop 61 may also include cam follower 66 coupled thereto that is adapted to engage one or more positioning guides and help facilitate desired lateral movement of the board stop 61 (see FIGS. 4*a* and 4*b*).

In various embodiments, a lead in support structure 10 may include an initial positioning guide 25 (see FIGS. 5*a*, 5*b*) that is generally disposed parallel to the direction of flow and is adapted to initially control positioning of the board stops 61 prior to moving into a desired position to engage an end of a workpiece. In some embodiments vertical support member 10 lacks an initial positioning guide.

A horizontal or laterally displaced structure 20 may disposed relative to the chains 86 (e.g. above or below), and adapted to help move board stops 61 about board stop guides 62. A lateral positioning guide 26 (see FIGS. 3a-3e, 5a, 5b, 7a, and 7b) may be angularly disposed about the lateral structure 20 relative to the direction of flow, and be adapted to cause lateral movement of the board stops transverse to the direction of flow. A plurality of fixed longitudinal guides 30 placed at intervals along lateral positioning guide 26 and which are generally parallel to the direction of flow.

In various embodiments, a plurality of adjustable guides 50 may be movably coupled to longitudinal guides 30, such that a continuous channel may be defined from the lateral positioning guide 26 through the distal end of an adjustable guide 50. In various embodiments, adjustable guide 50 may be pivotably coupled at their distal ends to one or more shifting members 54.

Figure 5A:
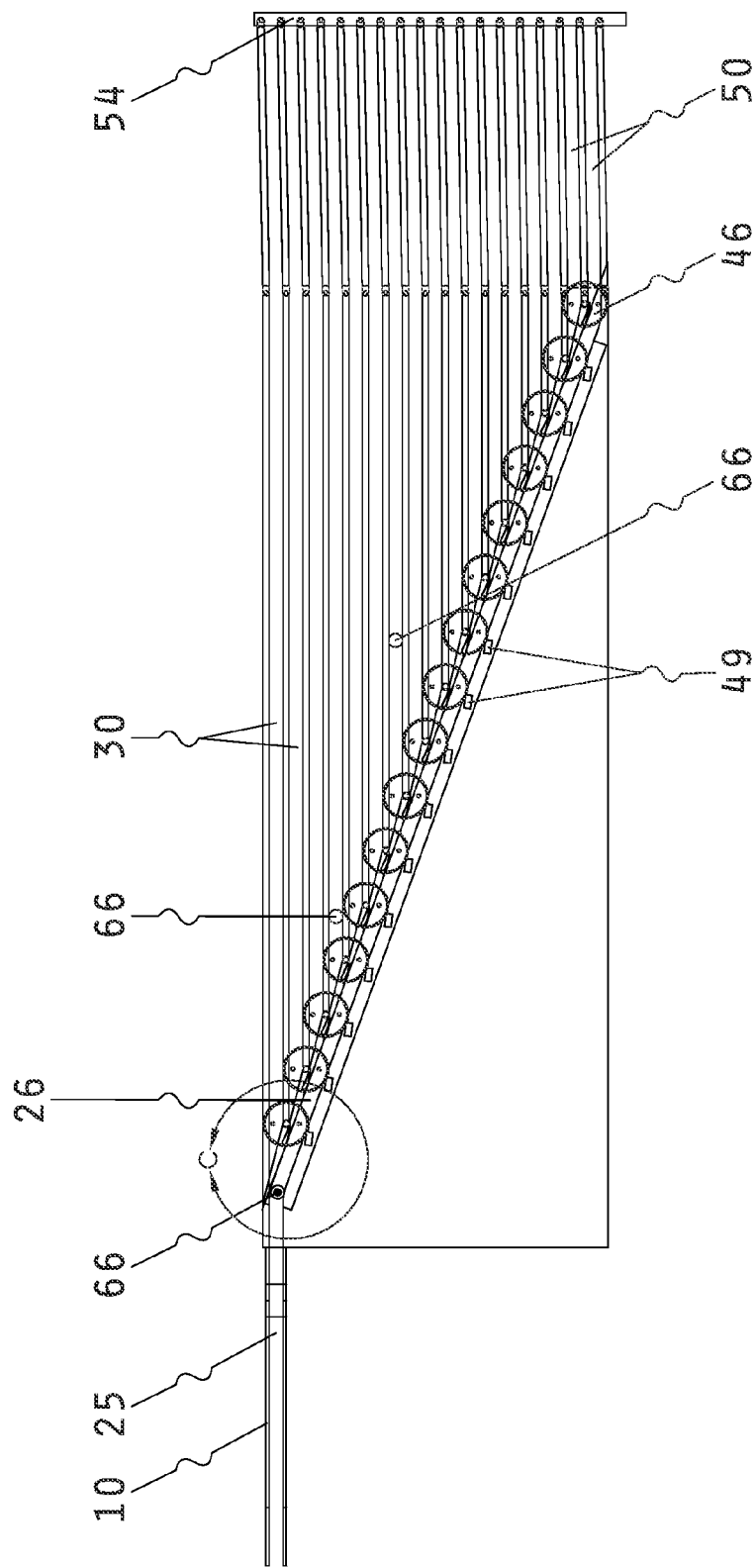
FIGS. 5a-5b illustrate bottom views of moving fence apparatuses in accordance with various embodiments.
Figure 5B:
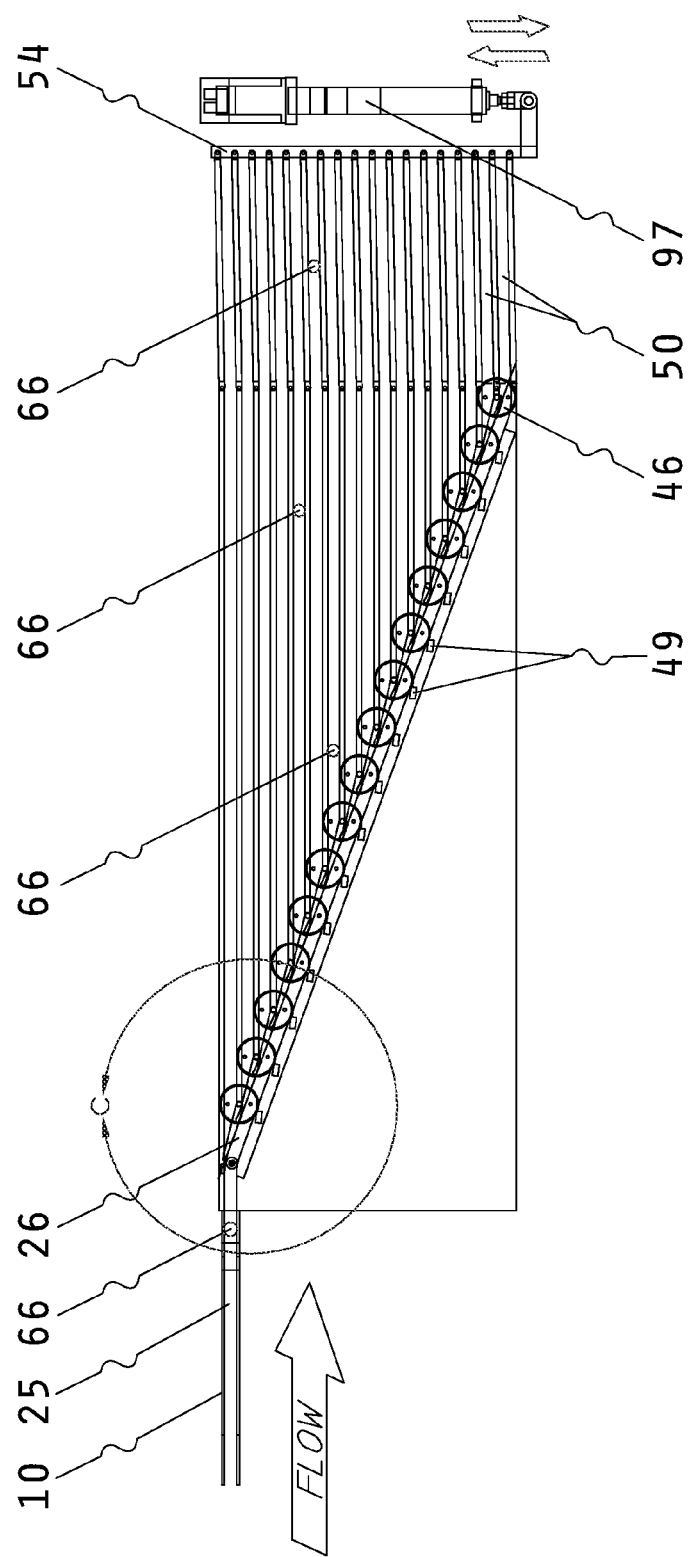

In embodiments, the guides 25, 26, 30 and/or 50 may be sized to accommodate a cam follower 66 that may be coupled to a board stop 61 (see e.g. FIGS. 5a, 5b). One or more guide selectors 46 may be disposed along the horizontal positioning guide and adapted to direct the cam follower to transition from the lateral positioning guide to a selected one of the longitudinal guides 30 and/or adjustable guides 50. A reset guide 70 may be disposed on a return side of the continuous track loop and configured to cause the board stops 61 to move laterally along the board stop guides 62 to a desired position, such as a home position. The home position may be the same position as the position established in the initial positioning guide 25.

In the operation of the illustrated embodiment, board stop guides are translocated along the length of the continuous track loop at the same rate as (and in parallel with) board conveyance along the board conveyor. Board stops 61 are slideably mounted on board stop guides 62 such that they are moveable along a plane perpendicular to the length of the continuous track loop. As board stop guides 62 are conveyed along the top and around the end to the underside of the apparatus, the reset guide 70 angles toward the vertical support 10, pushing/sliding the board stops 61 along the board stop guides 62 toward a board stop starting position, e.g. a home position.

As the board stop guides 62 are conveyed upward from the underside of the continuous track loop to the upper side of the continuous track loop, cam followers 66 engage transition from engagement of the initial positioning guide 25 to the lateral positioning guide 26 (see FIGS. 3a-3e, top view, and FIGS. 5a, 5b, view from below). With the lateral positioning guide 26 extending at an oblique angle within the horizontal plane, the translocation of a cam follower 66 along the lateral positioning guide 26 repositions board stop 61 along board stop guide 62, moving board stop 61 away from the starting position in a lateral direction (i.e. across the width of the continuous track loop).

A guide selector 42 positioned near a longitudinal guide 30 (see FIGS. 5a, 5b, and 7a, 7b) is controlled by a guide selector actuator 46. In a first position (FIGS. 6a, 6b) guide selector 42 prevents entry of cam follower 66 into fixed longitudinal guide 30 as the cam follower 66 is translocated along lateral positioning guide 26. In a second position, the guide selector 42 moves to block further translocation of cam follower 66 along the lateral positioning guide 26, thereby diverting the cam follower 66 into the longitudinal guide 30. The diversion of the cam follower 66 to the selected longitudinal guide 30 may cause the corresponding board stop 61 to generally stop translocation along board stop guide 62. At this stage, board stop 61 has been roughly positioned and continues to be moved in a direction parallel to the direction continuous track loop.

In various embodiments, each longitudinal guide 30 may be pivotably coupled to an adjustable guide 50. In the illustrated embodiments, each adjustable guide 50 is pivotably coupled at its distal end, by a hinge pivot 56, to a shifting member 54, which may shift laterally to move the distal ends of the adjustable guides 50, thereby altering the angle of adjustable guides 50, allowing for fine positioning of board stops 61. One or more actuators 97 may be coupled to the shifting member 54 to urge such lateral movement (i.e. perpendicularly to the direction of track loop operation). In various embodiments, the longitudinal guides 50 can be adjusted by rotationally positioning the lateral structure 20 to achieve the fine positioning.

In the embodiment illustrated, as cam follower 66 exits the distal end of adjustable guides 50, cam follower 66 and board stop 61 continue to move along the continuous track loop toward the underside or return side of the device, whereat cam followers 66 engage reset guide 70 to reset the position of board stop 61 on board stop guide 62 to the starting position. The translocation of board stops 61 on board stop guides 62 along the continuous track loop is synchronized with the translocation of boards/lugs along a board conveyor, such that board stops 61 are brought into contact with board ends. Thus, board stops 61 may be used to adjust the lateral position of the boards as they approach a sawing/trimming station or other processing station, first by gross position adjustment (longitudinal guides) and then by fine position adjustment (adjustable guide). The use of such guides allows for positioning without the use of brakes, air actuators/hydraulic devices and other mechanisms as part of the rotating elements, which increase mass, induce vibration and limit speed.

Figure 3A:
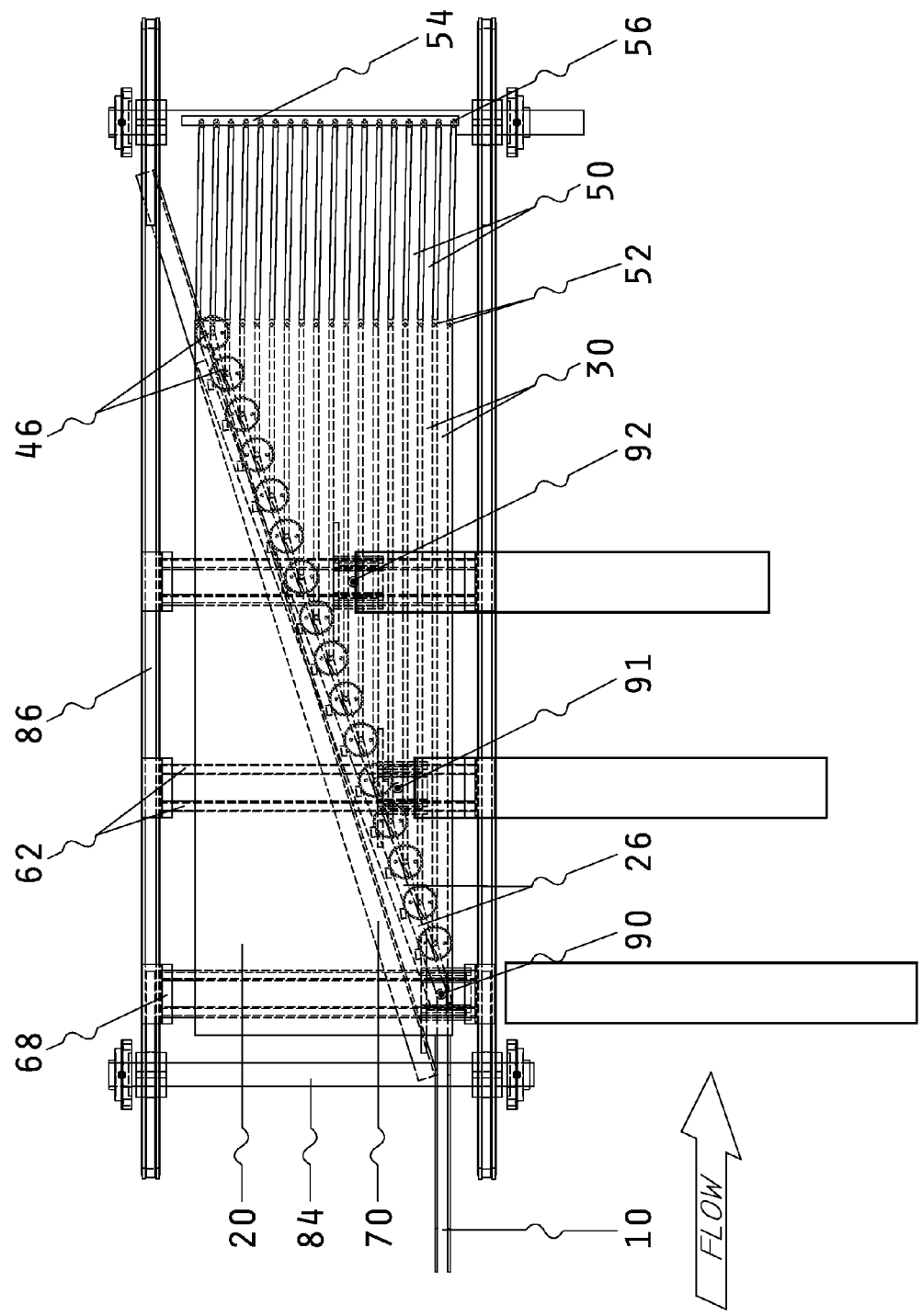
FIGS. 3a-3e illustrate plan views of moving fence apparatuses in accordance with various embodiments.

FIGS. 3a-3e show plan views of embodiments of a moving fence apparatus. As shown in FIG. 3a, each longitudinal guide 30 is associated with a guide selector 42 and actuator 46. Guide selector actuators 46 may be, for example, solenoids controlled by a computing environment (e.g. a processor, a scanner, etc.) to select the optimal fixed longitudinal guide to which each cam follower 66 should be diverted. Additionally, shifting member 54 and/or one or more actuators coupled to shifting member 54 may be controlled by the same computing environment or by a different computing environment to more finely adjust the position of board stops 61 as described above.

In FIG. 3a, a first cam follower 90 is shown in/near the initial positioning guide 25 prior to repositioning of the board stop, with the board stop in the starting position. A second cam follower 91 has been diverted from the lateral positioning guide into a longitudinal guide and the coupled board stop has been correspondingly laterally repositioned along its board stop guide. A third cam follower 92 has been diverted into another longitudinal guide at a greater distance from the starting position, the coupled board stop having been correspondingly repositioned further along the board stop guide.

Figure 3B:
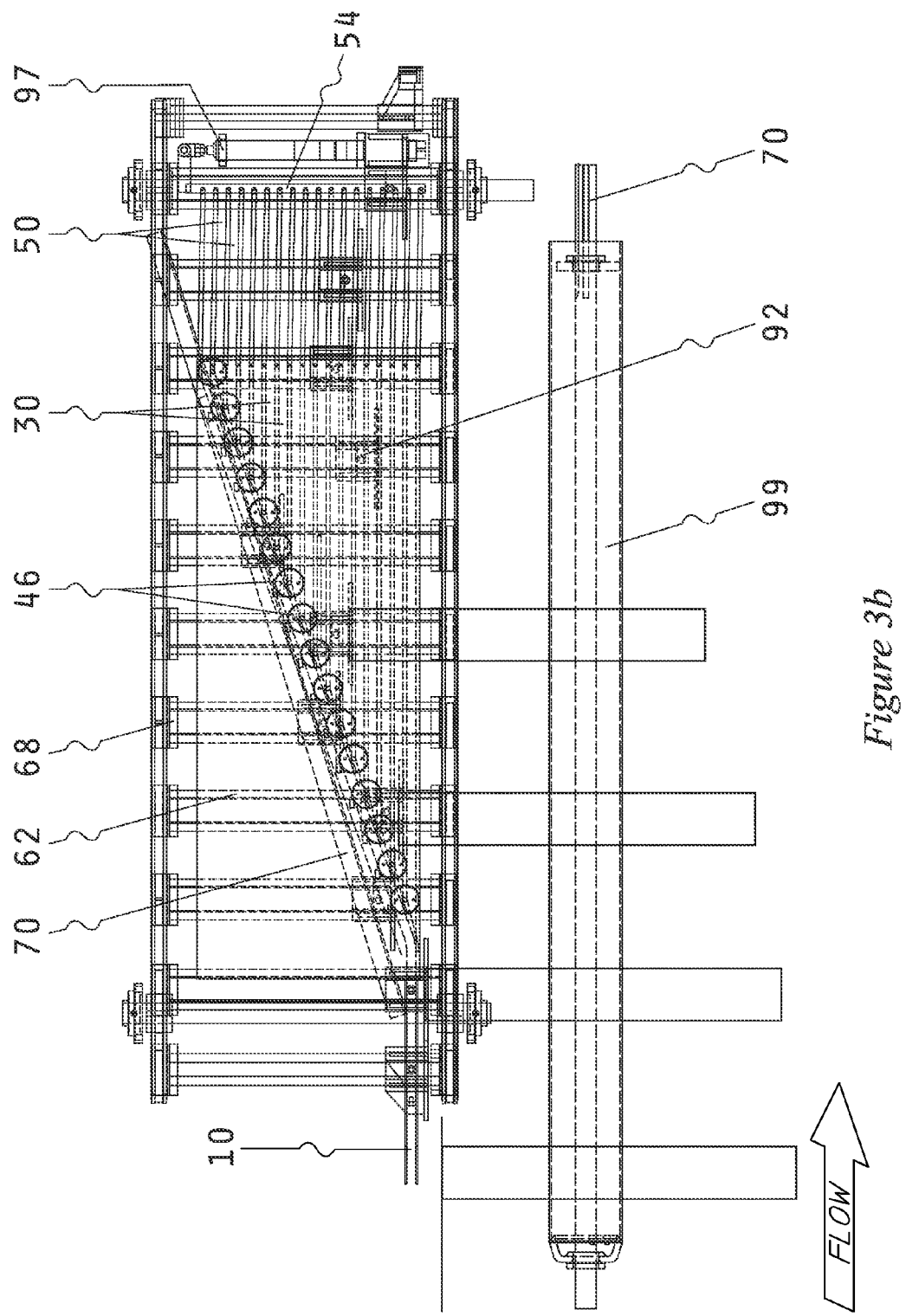
Figure 3D:
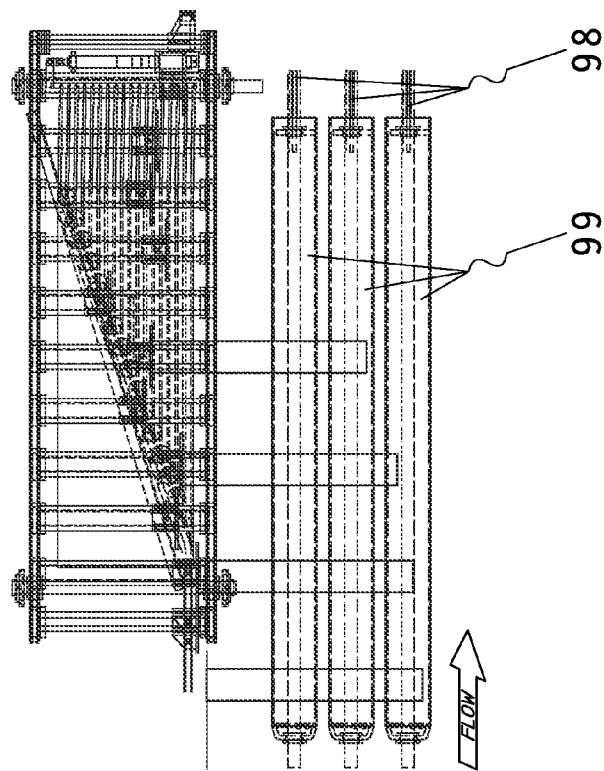
Figure 3C:
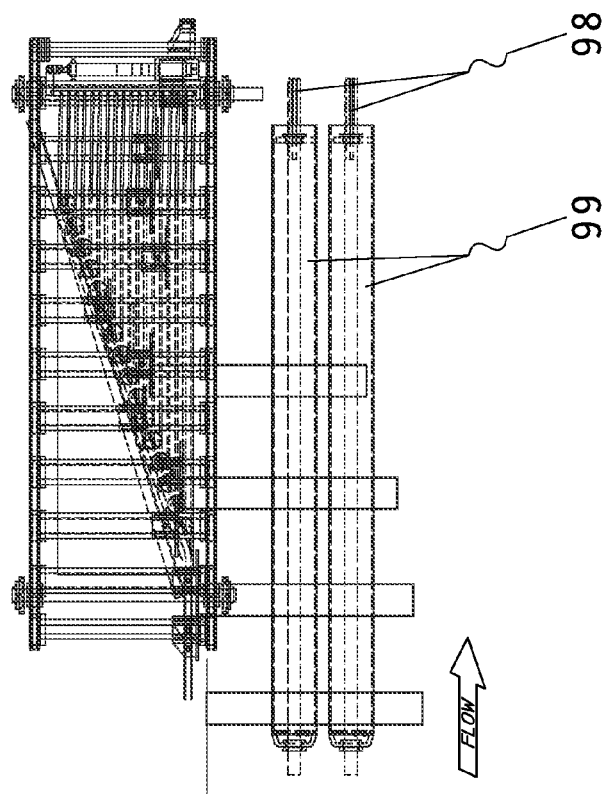

FIGS. 3b, 3c and 3d show embodiments which include one or more rolls 99 for moving boards laterally toward board stops. These embodiments are configured for pull applications, in which a board is driven against a board stop by the one or more rolls.

Figure 3E:
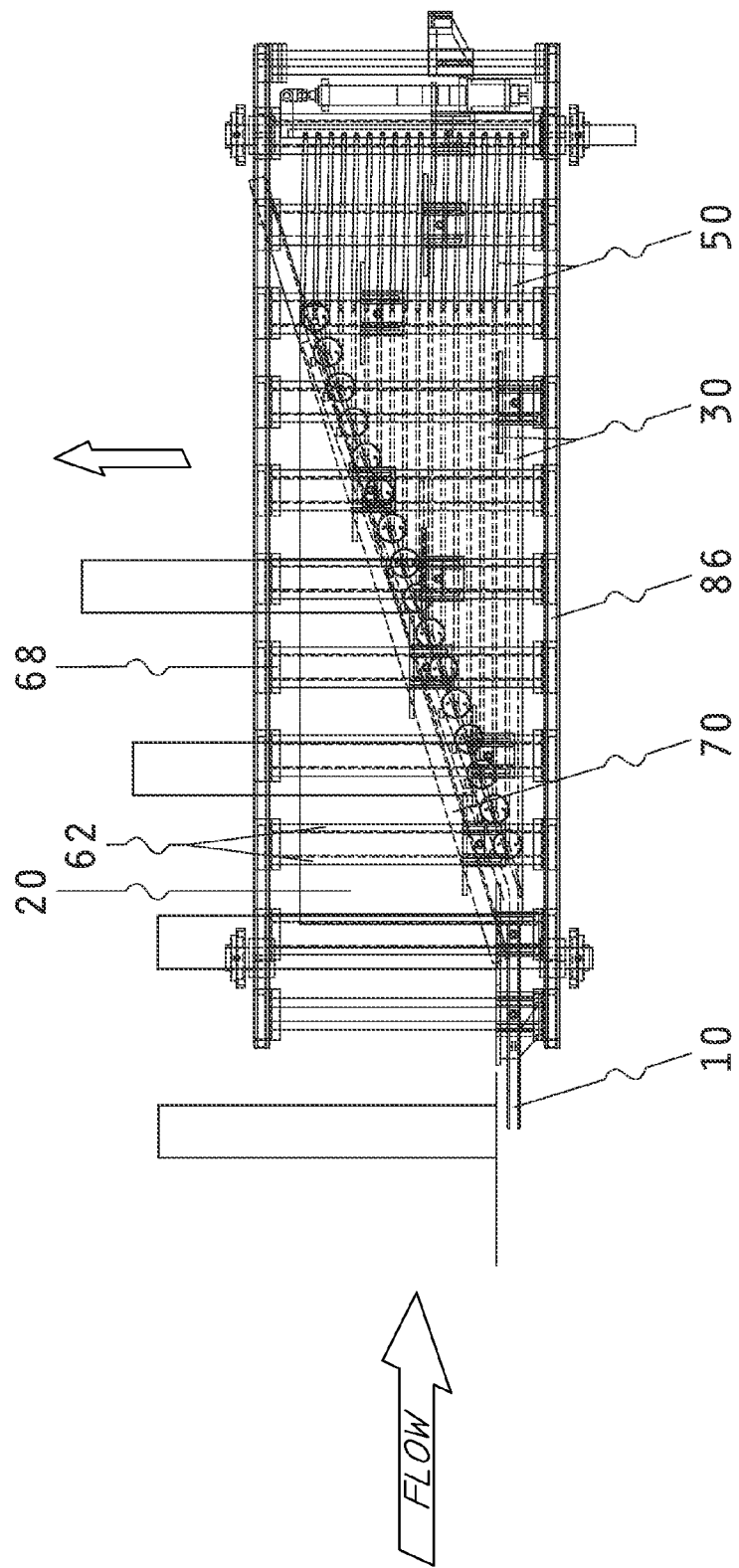

FIG. 3e shows an embodiment in which a board stop pushes a board laterally into a new position, with the vertical arrow showing the direction of the push. In this embodiment, the board stops are reversed in direction on their slide rails, allowing boards to be pushed to their final positions. One or more rolls and/or skate wheels may be used to ensure that the board remains against the paddle at the final position.

In various embodiments, the angle of the lateral positioning guide may be adjustable in order to increase or decrease the rate of lateral movement of the board stops about the board stop guides. In the illustrated embodiment, the angle of the lateral positioning guide with respect to the direction of continuous track loop operation is approximately 20°. However, the angle of the lateral positioning guide in various embodiments may be any angle within the range of 10°-80°. In some embodiments, the angle of the lateral positioning guide may be adjusted manually, while in other embodiments, the angle of the lateral positioning guide may be adjusted by an actuator. In an embodiment, some or all of the guides may be channels formed by removal of material from a solid structure, while in other embodiments some or all of the positioning guides are formed by placing elements (e.g. rails, etc.) at the desired intervals along a surface of the lateral structure.

Board stop guides 62 are shown in the figures as paired cylindrical elements, but the configuration of board stop guides 62 may vary widely among embodiments and may include one, two, three, four or more channels, tracks, solid members, cylindrical/edged/grooved elements, etc. Similarly, board stops 61 are shown in the figures as being slideably mounted to board stop guides 62 with a slide mount 64. However, guide mounts may vary widely among embodiments to include various elements (e.g. bearing based arrangements, or other slide mechanisms generally known in the art). A guide mount may be absent in some embodiments (e.g. board stops 61 may be slideably mounted directly to board stop guides 62 without additional components).

Figure 4A:
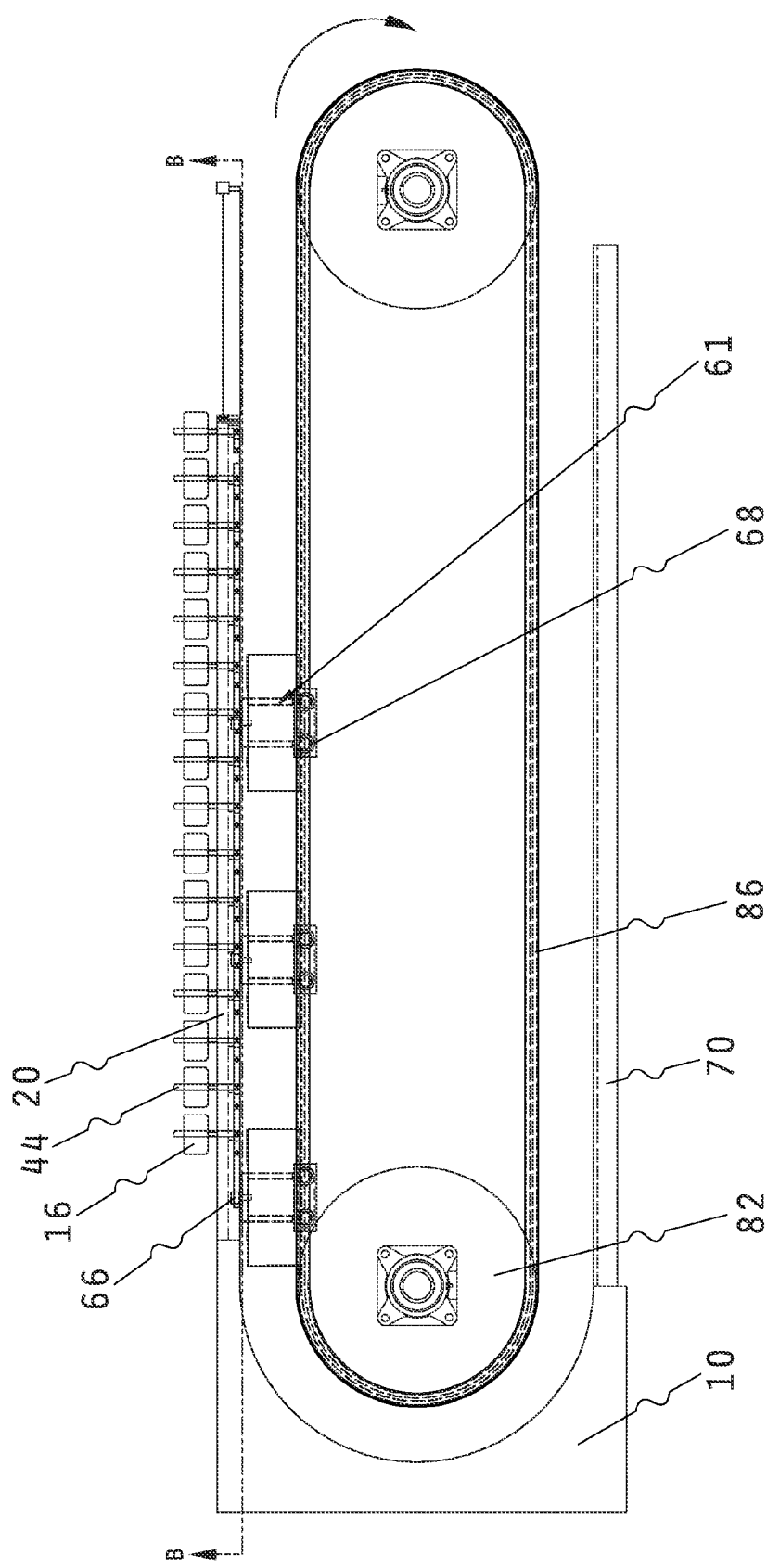
FIGS. 4a-4b illustrate side elevational views of moving fence apparatuses in accordance with various embodiments.
Figure 4B:
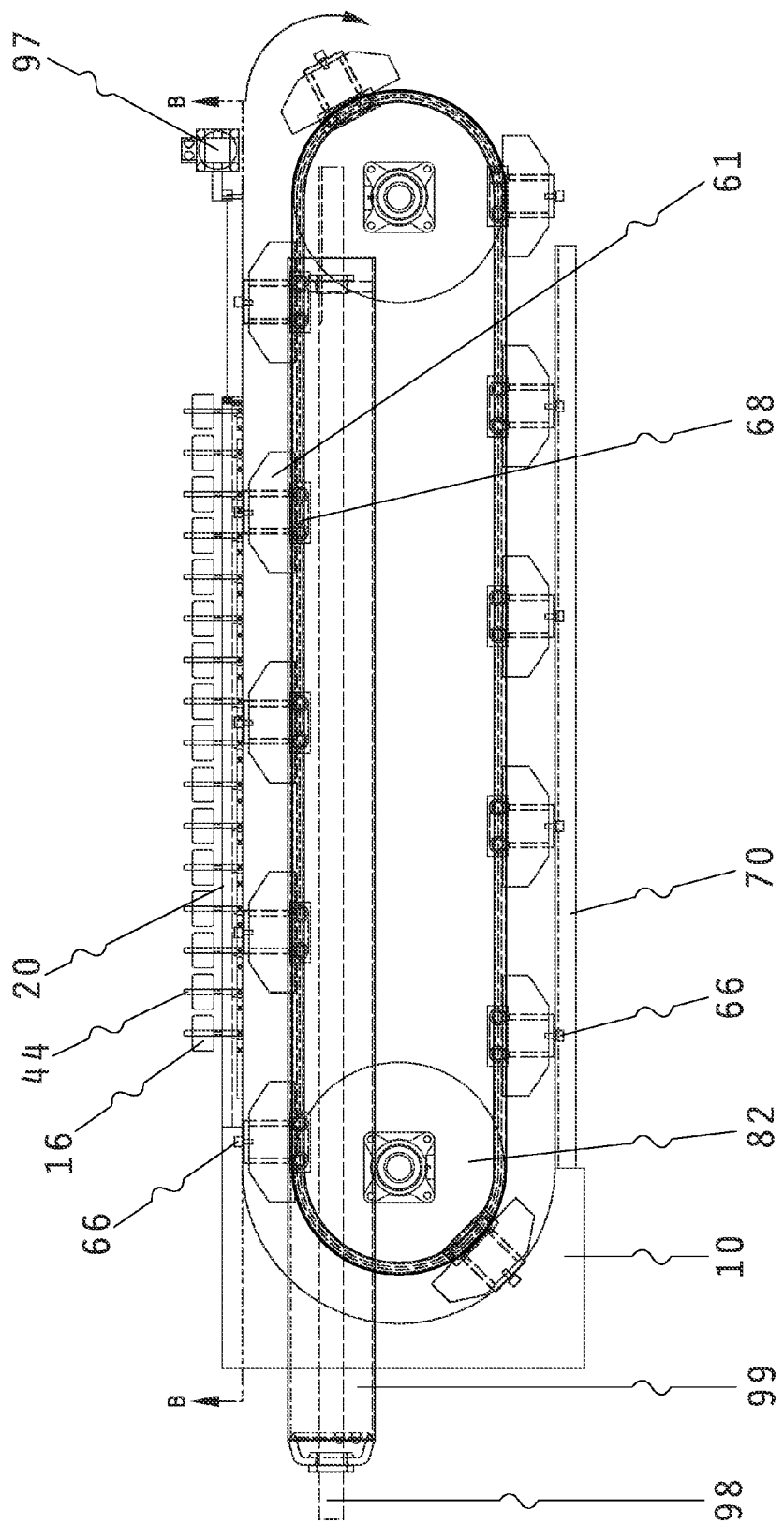

FIGS. 4a and 4b illustrate side elevational views of a moving fence apparatus in accordance with various embodiments. In the embodiment shown in FIG. 4a, the apparatus may be configured such that board stops 61 are conveyed along a horizontal plane below the level of the guide selector actuators and guides. This configuration may help prevent dust and debris from boards from falling into the components, such as the guide selector actuators and guides, and interfering with proper operation. However, in other embodiments, lateral structure 20 may be oriented with guide selectors and and/or guides disposed below the level of the board stops and/or the board stop guides. In various embodiments, the system may be configured to position the board stop along the desired longitudinal guide, and then have a transverse roll, skate wheel, or other urging device push the board against the board stop ("pull" embodiments). In other embodiments, the system may be configured such that the boards may be positioned by the board stops pushing them laterally ("push" embodiments).

FIG. 4b shows an embodiment that additionally includes a roll 99 rotatable around a roll shaft 98. The illustrated embodiment also includes an actuator 97 for lateral positioning of the shifting member/adjustable guides, which provides fine positioning of board stops 61.

FIGS. 5a and 5b illustrate sectional views of a moving fence apparatus in accordance with various embodiments. The view illustrated in FIG. 4a is a sectional view from below the section marked in FIG. 3a, showing the underside of the lateral structure 20 from the vantage of a horizontal plane between the lateral structure 20 and the chains 86. Likewise, FIG. 4b is a sectional view from below the section marked in FIG. 4b. Guide selector stops 49 are shown in proximity to guide selectors 42 (see also FIGS. 7a and 7b). Guide selector actuator 46 may be coupled to guide selector 42 by a guide selector pivot 44, and is rotatable in opposite directions about guide selector pivot 44, such that guide selector actuator 46 can move the corresponding guide selector 42. When a guide selector 42 is positioned to block lateral positioning guide 26 and to divert a cam follower into the corresponding longitudinal guide, the guide selector 42 may be prevented from over-rotating (unblocking the lateral positioning guide) by a guide selector stop 49, which stops the guide selector 42 in a position for diverting the cam follower into the longitudinal guide. FIG. 5b also shows an embodiment that includes an actuator 97 coupled to shifting member 54 and operable to shift the adjustable guides 50. In this illustration, the adjustable guides 50 have been slightly shifted for fine adjustment of board stop position, as described above.

In various embodiments, e.g. those with solenoid actuators, selection of a longitudinal guide for diversion of a cam follower may be accomplished by sending a signal from a computing environment to the actuator corresponding to the selected longitudinal guide. Some or all of the guide selectors may be positioned to block a longitudinal guide at rest and to block the lateral positioning guide upon activation of the actuator, while in other embodiments, some or all of the guide selectors may be positioned to block the lateral positioning guide unless/until the corresponding actuator is activated.

While the illustrated embodiments include both longitudinal guides and adjustable guides, in various embodiments, longitudinal guides may be themselves adjustable. In such embodiments, the longitudinal guides become adjustable guides that are pivotally coupled to a longitudinal positioning guide at intervals along the lateral positioning guide. In some embodiments, series of adjustable guides may be pivotably coupled consecutively, end-to-end, and each series of adjustable guide may be pivotally coupled to a lateral positioning guide. In an embodiment of this type, each adjustable guide section may be limited to a maximum/minimum range within which the guides may be adjusted, providing for varying degrees of adjustment along the length of the lateral structure 20. Additionally, embodiments comprising adjustable guides without longitudinal guides may include any/all of the means of guide selection described above.

Figure 6B:
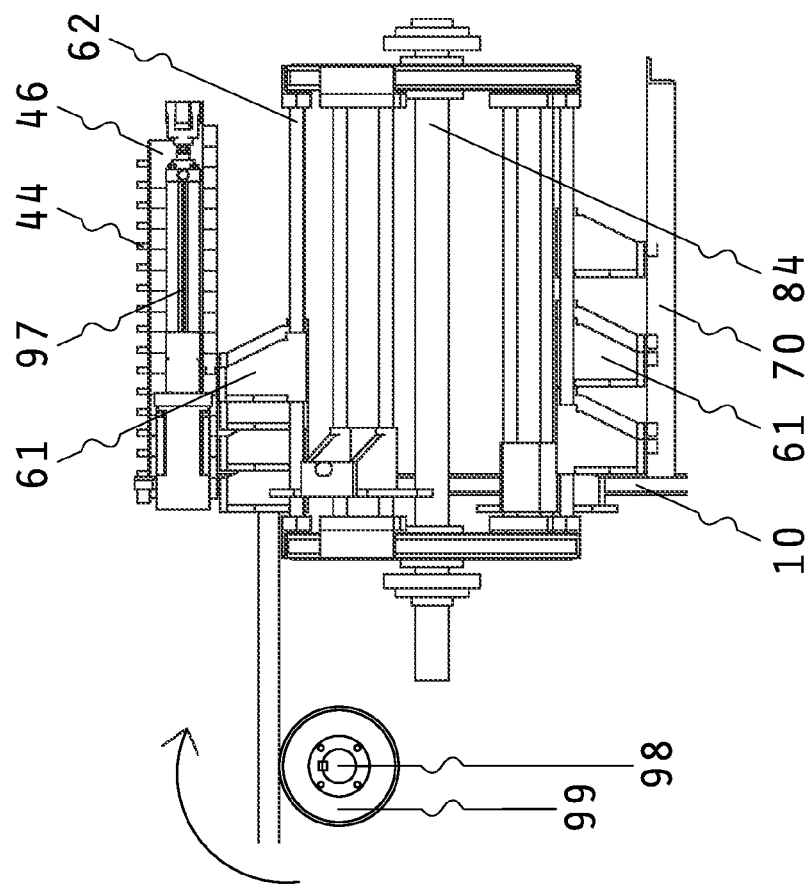
FIGS. 6a-6b illustrate rear elevational views of moving fence apparatuses in accordance with various embodiments.
Figure 6A:
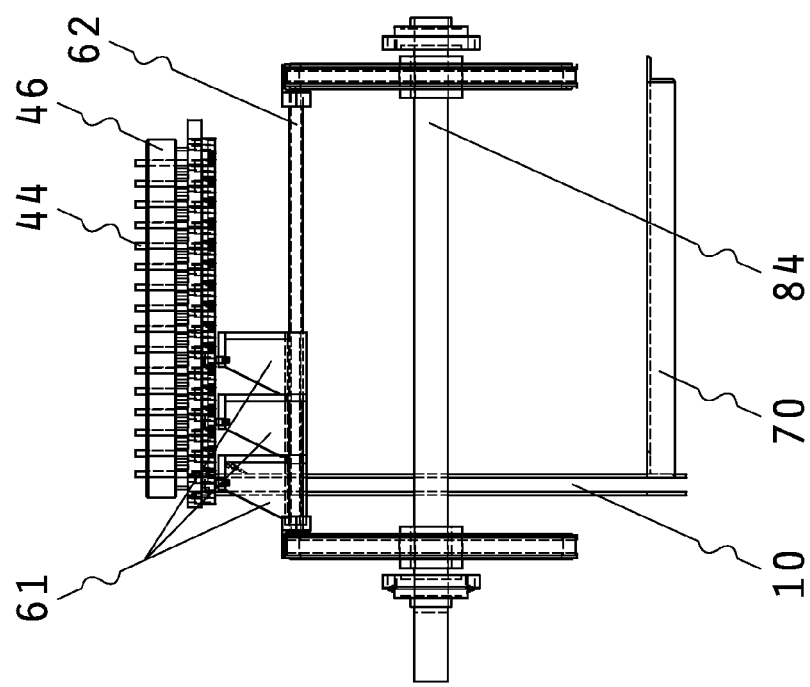

FIGS. 6a and 6b illustrate rear elevational views of a moving fence apparatus in accordance with various embodiments. FIG. 6a illustrates a rear elevational view of a moving fence apparatus that may be adapted for push and/or pull applications. FIG. 6b illustrates an embodiment that includes a roll 99 rotatable around a roll shaft 98, and an actuator 97. In this figure, a board is shown being pushed against a board stop 61 by the roll 99. As shown in the figures, each board stop 61 may be separately positioned across the width of the continuous track loop. While the illustrated embodiments use the continuous track loop configuration shown, continuous track loop mechanisms are well known in the art. Embodiments vary as to the continuous track loop mechanism employed, including any/all such mechanisms known in the art. For example, a continuous track loop may be powered or non-powered, may be a roller/belt/chain conveyor, and may include a chain drive for power transmission. In some embodiments, a continuous track loop may be powered by another conveyor and/or the drive used to power another conveyor. The embodiments described herein are exemplary and are not intended to be limiting as to the continuous track loop mechanisms or other mechanisms known in the art and included within the various embodiments.

Figure 7B:
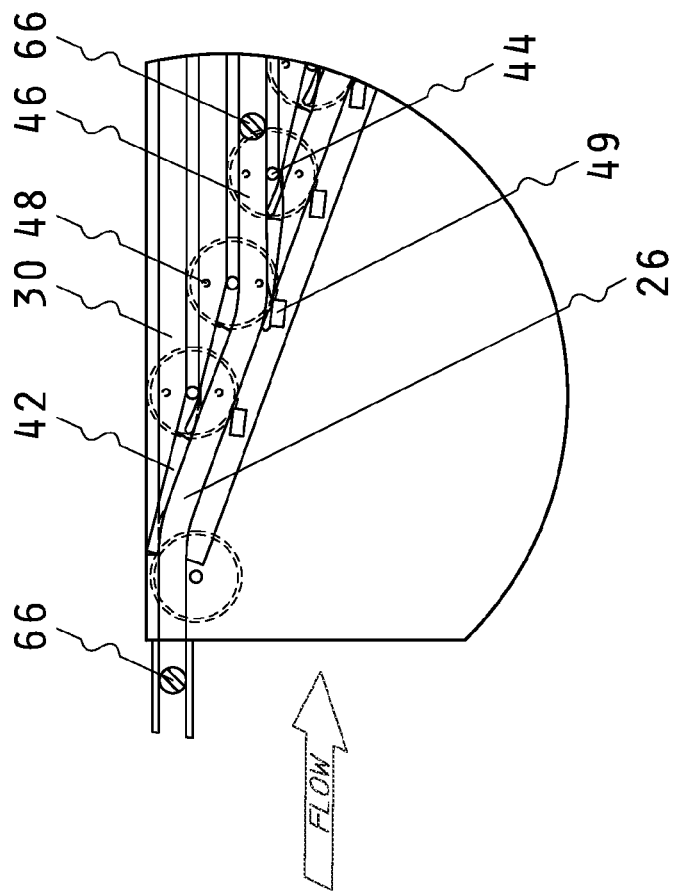
FIGS. 7a-7b illustrate an exploded view of components of a moving fence apparatus in accordance with various embodiments.
Figure 7A:
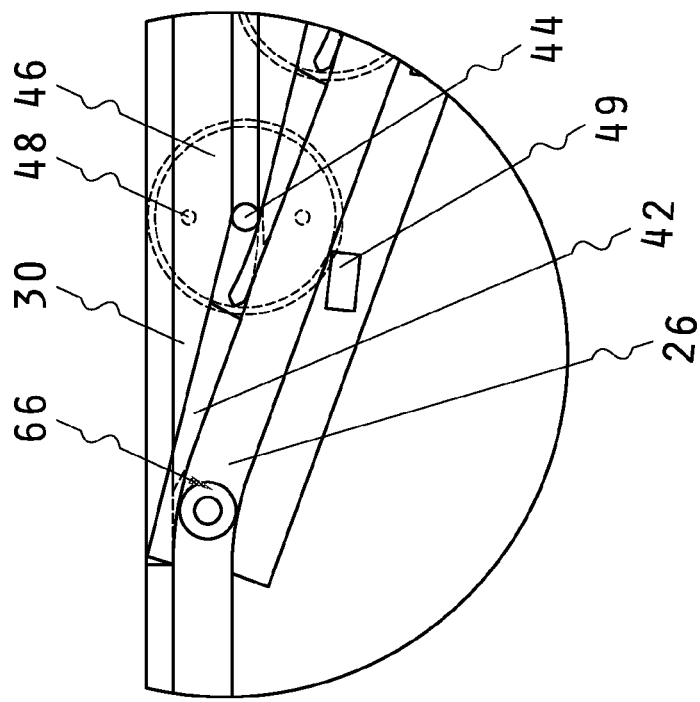

FIGS. 7a and 7b illustrate magnified views of components of a moving fence apparatus in accordance with various embodiments. Guide selector 42 is shown coupled to a guide selector pivot 44 generally at or near the interface of lateral positioning guide 26 and a longitudinal guide 30. Guide selector pivot 44 is coupled to guide selector actuator 46, which may be coupled to the lateral structure 20. In FIG. 7a, a guide selector 42 is shown blocking longitudinal guide 30.

In FIG. 7b, a guide selector 42 has been pivoted into position to divert the cam follower 66 from the positioning guide 26 into longitudinal guide 30.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A positioning apparatus for use with a rotary fence, wherein the rotary fence includes a board stop coupled with a continuous track loop, the continuous track loop is operable in a first direction of flow and the board stop is movable relative to the continuous track loop in a second direction that is transverse to the first direction of flow, the positioning apparatus comprising:
   a positioning guide with guide surfaces configured to engage the board stop, the guide surfaces including a lateral guide surface oriented transverse to the first direction and a plurality of longitudinal guide surfaces arranged at intervals along the lateral guide surface, the longitudinal guide surfaces defining a corresponding plurality of first lateral positions, wherein the positioning guide is operable to divert the board stop from the lateral guide surface to a selected one of the longitudinal guide surfaces to position the board stop at a corresponding one of the first lateral positions; and
   a shifting member coupled with a downstream end of the positioning guide, the shifting member configured to laterally displace a downstream end of the longitudinal guide surfaces to move the board stop to a second lateral position between adjacent ones of said first lateral positions.

2. The positioning assembly of claim 1, further including an actuator coupled to the shifting member, wherein the actuator is selectively operable to laterally displace the shifting member.

3. The positioning apparatus of claim 1, wherein the positioning guide comprises a lateral structure disposed in a plane generally parallel to the first direction of flow and coupled with the lateral and longitudinal guide surfaces, and the lateral structure is rotationally positionable to laterally displace the downstream end of the longitudinal guide surfaces to move the board stop to the second lateral position.

4. The positioning apparatus of claim 1, wherein the lateral guide surface is defined by a lateral guide and the longitudinal guide surfaces are defined by longitudinal guides having first ends and opposite second ends, the first ends coupled with the lateral guide and the second ends coupled with the shifting member.

5. The positioning apparatus of claim 4, wherein the first ends of the longitudinal guides are pivotably coupled with the lateral guide and the second ends of the longitudinal guides are pivotably coupled to the shifting member.

6. The positioning apparatus of claim 5, wherein the longitudinal guides have one or more pivot joints between the first and second ends, the first ends of the longitudinal guides are fixedly coupled with the lateral guide, and the second ends of the longitudinal guides are pivotably coupled to the shifting member.

7. The positioning apparatus of claim 1, the positioning guide further including a guide selector positioned at one or more of said intervals, the guide selector being movable from a first position wherein the longitudinal guide surface at said interval is blocked to a second position wherein the lateral guide surface is blocked.

8. A method of positioning a board stop of a rotary fence at a desired lateral position, wherein the rotary fence includes a continuous track loop operable in a first direction of flow and the board stop assembly is movable relative to the continuous track loop in a second direction that is transverse to the direction of flow, the method comprising:
   providing a guide apparatus with a lateral guide and a plurality of longitudinal guides arranged at intervals along the lateral guide, the lateral guide and the longitudinal guides configured to slideably engage the board stop from an upstream end of the lateral guide to a downstream end of the longitudinal guides, wherein the intervals define corresponding first lateral positions;
   diverting the board stop from the lateral guide to a selected one of the longitudinal guides to position the board stop at the corresponding one of said first lateral positions; and
   laterally displacing a downstream end of the longitudinal guides to position the downstream end of the selected one of the longitudinal guides at the desired lateral position, wherein the desired lateral position is a second lateral position between adjacent ones of said first lateral positions.

9. The method of claim 8, wherein the guide apparatus includes guide selectors positioned at the intervals and individually operable to block the lateral guide downstream of the corresponding longitudinal guides, and wherein diverting the board stop from the lateral guide to the selected one of the longitudinal guides includes actuating the corresponding one of the guide selectors to block the lateral guide downstream of the selected one of the longitudinal guides.

10. The method of claim 8, wherein the guide apparatus includes guide selectors positioned at the intervals and individually actuable to unblock the longitudinal guide, and wherein diverting the board stop from the lateral guide to the selected one of the longitudinal guides includes actuating the corresponding one of the guide selectors to unblock the selected one of the longitudinal guides.

11. The method of claim 8, wherein a downstream end of the guide apparatus is coupled with a shifting member, and laterally displacing the downstream end of the longitudinal guides includes displacing the shifting member substantially in the second direction.

12. The method of claim 11, wherein the guide apparatus further includes a lateral structure coupled with the lateral guide and the longitudinal guides, and laterally displacing the downstream end of the longitudinal guides includes rotationally positioning the lateral structure.

13. The method of claim 8, wherein the longitudinal guides have upstream ends pivotably coupled with the lateral guide and downstream ends pivotably coupled with a shifting member, and laterally displacing a downstream end of the longitudinal guides includes displacing the shifting member substantially in the second direction.

14. A system for positioning a board on a conveyor, the system comprising:
   a continuous track loop operable in a first direction of flow;
   a board stop guide mounted to the continuous track loop;
   a board stop slideably mounted to the board stop guide and movable along the board stop guide in a second direction generally perpendicular to the first direction;

a positioning guide disposed in a plane generally parallel to the first direction and having a first engaging surface and a plurality of second engaging surfaces configured to slideably engage the board stop, the first engaging surface extending transverse to the first direction and the second engaging surfaces extending generally in the first direction; and a shift member coupled with the positioning guide, the shift member actuable to laterally reposition a downstream end of the second engaging surfaces, wherein the positioning guide is configured to guide the board stop to a selected one of a plurality of first lateral positions relative to the continuous track loop, and wherein the shift member is operable to move the board stop from the selected one of the plurality of first lateral positions to a desired lateral position relative to the conveyor.

15. The system of claim 14, further including a return guide coupled with the continuous track loop, the return guide configured to reset the board stop from the desired lateral position to an initial lateral position for engagement with the first engaging surface.

16. The system of claim 14, wherein the positioning guide is pivotable, and the shift member is configured to laterally reposition the downstream end of the positioning guide by rotating the positioning guide.

17. The system of claim 14, further including a first actuator coupled with the shift member, the first actuator configured to displace the shift member substantially in the second direction.

18. The system of claim 17, further including a computing device operatively coupled with the first actuator, the computing device configured to control the first actuator to move the board stop from the selected one of the plurality of first lateral positions to the desired lateral position.

19. The system of claim 18, further including one or more second actuators operatively coupled with the positioning guide, the one or more second actuators operable to halt translocation of the board stop along the board stop guide at the selected one of the plurality of first lateral positions.

20. The system of claim 19, wherein the computing device is operatively coupled with the one or more second actuators and further configured to control the one or more second actuators to move the board stop to the selected one of the plurality of first lateral positions.

21. The system of claim 19, wherein the computing device is operatively coupled with the continuous track loop and further configured to coordinate operations of the continuous track loop, the first actuator, and the one or more second actuators to move the board stop to the desired lateral position.

22. The system of claim 21, wherein the computing device includes a scanner.

23. A method of modifying a rotary positioning fence for positioning boards on a conveyor, wherein the rotary positioning fence has a continuous track loop operable in a direction of flow and a board stop coupled with the continuous track loop, and the board stop is movable relative to the continuous track loop in a second direction of flow that is transverse to, and substantially co-planar with, the first direction, the method comprising:

providing a positioning guide in a plane generally parallel to the first and second direction, wherein the positioning guide has a first engaging surface oriented transverse to the first direction and a plurality of second engaging surfaces oriented generally parallel to the first direction, the first and second engaging surfaces configured to slideably engage the board stop assembly; and coupling a shift member with the positioning guide, the shift member configured to laterally displace a downstream end of the second engaging surfaces substantially within said plane, wherein the positioning guide is operable to guide the board stop to a selected one of a plurality of first lateral positions relative to the continuous track loop, and wherein the shift member is operable to move the board stop from the selected one of the plurality of first lateral positions to a desired lateral position relative to the conveyor.

24. The method of claim 23, wherein the positioning guide is pivotable, and the shift member is configured to laterally displace the downstream end of the positioning guide by rotationally positioning the positioning guide.

25. The method of claim 24, further comprising operatively coupling a computing device with the shift member, wherein the computing device is configured to control the shift member to move the board stop to the desired lateral position.

26. The method of claim 23, wherein the downstream end of the positioning guide includes a plurality of second guides pivotably coupled with the first guide at fixed intervals along the first guide and configured to slideably engage the board stop the plurality of first lateral positions defined by the plurality of second guides, and wherein coupling the shift member with the positioning guide includes pivotably coupling the shift member with downstream ends of the second guides.

27. The method of claim 23, further comprising coupling a first actuator with the shift member, the first actuator configured to displace the shift member substantially in the second direction.

28. The method of claim 27, further including operatively coupling one or more second actuators with the positioning guide, the one or more second actuators operable to substantially halt lateral translocation of the board stop relative to the continuous track loop at the selected one of the plurality of first lateral positions.

29. The method of claim 28, further including operatively coupling the computing device with the one or more second actuators, the computing device configured to control the one or more second actuators to position the board stop guide at the selected one of the plurality of first lateral positions.

* * * * *